United States Patent Office 3,328,372
Patented June 27, 1967

3,328,372
SOLUBLE HIGH MOLECULAR WEIGHT POLYMERS OF CYCLOPENTADIENE
Robert M. Thomas, Mountainside, and Irving Kuntz, Westfield, N.J., assignors to Esso Research and Engineering Company, a corporation of Delaware
No Drawing. Filed May 11, 1964, Ser. No. 366,643
18 Claims. (Cl. 260—93.1)

The present invention relates to a process for preparing polymers of cyclopentadiene and to the novel polymer products prepared according to that process. In particular, this invention relates to a new and unique catalyst for polymerizing cyclopentadiene to soluble, high molecular weight polymers. More particularly, this invention relates to the utilization of a catalyst comprising the reaction product of about equimolar amounts of a diaryl or triaryl methyl halide and a Friedel-Crafts type halide. Still more particularly, this invention relates to the use of said aryl methyl halide-Friedel-Crafts type halide catalyst in combination with an aliphatic halide solvent.

Cyclopentadiene can be polymerized into two general types of polymers. One is characterized by being soluble in organic solvents such as benzene, toluene, chloroform, carbon tetrachloride, etc., and the other is characterized by being insoluble in such organic solvents.

It is known that cyclopentadiene can be easily polymerized with cationic or Ziegler catalysts to insoluble high molecular weight polymers or to soluble, low molecular weight polymers. These soluble polymers have average molecular weights of about 500 to about 2000. The preparation of soluble, high molecular weight polymers has, however, not been reported.

Soluble, low molecular weight polymers of cyclopentadiene have been described as early as 1926 by Staudinger and Brusson, Annalen der Chemie, vol. 447, p. 118 (1926). Since then, many attempts have been made to prepare soluble polycyclopentadiene of high molecular weight using Friedel-Crafts type catalysts; however, these attempts have resulted in the formation of products which are partially or completely insoluble and useless because of the inordinate amount of cross-linking reactions which take place during the polymerization. In general, the higher the molecular weight of the polymer unit, the less the cross-linkage that can be tolerated without making an insoluble product. More recently, soluble polycyclopentadiene of somewhat higher viscosity average molecular weight, e.g. 30,000, has been obtained with Ziegler type catalysts. However, it has up to this time been impossible to prepare soluble, polycyclopentadiene having a viscosity average molecular weight in the range of about 50,000 to about 1,000,000 or higher.

The present invention overcomes the foregoing difficulties and affords a means by which a soluble, high molecular weight polycyclopentadiene can be prepared. It is, therefore, an object of the present invention to provide the art with a novel method for preparing the aforementioned type of polycyclopentadiene. It is also an object of the present invention to provide the art with a new and unique catalyst system for polymerizing cyclopentadiene to soluble polymers of higher molecular weight than have heretofore been reported.

According to the present invention, cyclopentadiene is is polymerized, under essentially anhydrous conditions, with a catalyst comprising the reaction product of about equimolar amounts of a diaryl or triaryl methyl halide and a Friedel-Crafts type halide, at a temperature of between about 0° C. and about —100° C. in a liquid aliphatic halide solvent.

Cyclopentadiene is a commercially available cyclic conjugated diolefin. It is obtained by the thermal cracking of gas oils and naphthas and has a very pronounced tendency to dimerize. It, consequently, is transported and marketed as the dimer, dicyclopentadiene. Monomeric cyclopentadiene is then derived from the catalytic or thermal cracking of the dimer.

The catalyst utilized in the present novel process comprises the reaction product of about equimolar amounts of a diaryl or triaryl methyl halide and a Friedel-Crafts type halide. It is not known whether the catalyst is a true salt or a complex, but for purposes of the present process and for convenience, it will be referred to as a salt. In general, the catalyst salts of the present process are comprised of one mole each of the aryl methyl halide and the Friedel-Crafts halide. Solutions of the catalyst salts in a solvent, such as methylene chloride, usually possess and exhibit various shades of yellow, orange and red colorations.

The aryl methyl halides which can be utilized to prepare the catalyst of the present novel process are diaryl or triaryl methyl halides. Generally, they are represented by the formula, $R_nCH_mX$, wherein R is selected from the group consisting of phenyl, substituted phenyl, naphthyl and substituted naphthyl, X is halogen, $n$ is an integer of 2 to 3, $m$ is an integer of 0 to 1 and $m$ plus $n$ equals 3. The organic aryl radical represented by R in the aforesaid formula can be substituted with a variety of organic and inorganic radicals, such as for example $C_1$–$C_{12}$ alkyl, phenyl, chlorine, bromine, methoxy, etc. However, regardless of the nature of the substituents on the aromatic ring, the essential structural feature which is characteristic of the aryl methyl halides and which gives them their catalytic activity is that they are diaryl or triaryl methyl halides.

More specifically, the aryl methyl halide component of the present novel catalyst system is characterized by the following structural formula:

wherein $R_1$ is selected from the group consisting of phenyl, alkylphenyl, alkoxyphenyl, halophenyl, naphthyl, alkylnaphthyl, alkoxynaphthyl and halonaphthyl; $R_2$ is selected from the group consisting of hydrogen, phenyl, alkylphenyl, alkoxyphenyl, halophenyl, naphthyl, alkylnaphthyl, alkoxynaphthyl and halonaphthyl; and X is selected from the group consisting of chlorine and bromine.

Specific examples of the aryl methyl halides which may be utilized in the present process include: triphenyl methylchloride, triphenyl methylbromide, diphenyl methylchloride, diphenyl methylbromide, dinaphthyl methylchloride, trinaphthyl methylbromide, 4-methylphenyl diphenyl methylchloride, tri-(3-chlorophenyl) methylchloride, di-(3-bromophenyl) methylbromide, di-(2-chloronaphthyl)-6-methylchloride, di-(4-methoxyphenyl) phenyl methylbromide, 4-butylphenyl phenyl methylchloride, 3-decylphenyl diphenyl methyl chloride, and diphenyl-1-naphthyl methylchloride.

The Friedel-Crafts halide component of the instant catalyst comprises all of the metal and metalloid halides conventionally used in Friedel-Crafts catalysts. A partial listing includes: $SbCl_3$, $SbCl_5$, $SnCl_4$, $AlCl_3$, $AlBr_3$, $BCl_3$, $ZnCl_2$, $FeCl_3$, $TiCl_4$, $TiCl_3$, $ZrCl_4$, $UrCl_4$, $GaCl_4$, $VCl_4$, $BF_3$ and $VOCl_3$, etc. In addition, alkyl aluminum halide compounds may be used in place of the Friedel-Crafts halide component of the catalyst. These alkyl aluminum halide compounds may be represented by the formula:

wherein R is a branched or straight chain alkyl group having from 1 to 12 carbon atoms, X is selected from the group consisting of chlorine and bromine, and $c$ is an integer of from 1 to 2. Examples of suitable alkyl aluminum halide compounds include: dimethyl aluminum chloride, methyl ethyl aluminum chloride, methyl propyl aluminum chloride, diethyl aluminum chloride, dipropyl aluminum chloride, diisopropyl aluminum chloride, dibutyl aluminum chloride, diisobutyl aluminum chloride, dipentyl aluminum chloride, dihexyl aluminum chloride, didecyl aluminum chloride, methyl aluminum dichloride, diethyl aluminum bromide, diisobutyl aluminum bromide, dimethyl aluminum bromide, dioctyl aluminum bromide, ethyl aluminum dichloride, butyl aluminum dibromide, ethyl aluminum dibromide, etc.

Any combination of aryl methyl halide and Friedel-Crafts type halide, as defined above, may be utilized as the catalyst for the present process. Specific combinations which may be used include: triphenylmethyl antimony hexachloride, triphenylmethyl aluminum tetrachloride, triphenylmethyl tin pentachloride, triphenylmethyl boron tetrachloride, triphenylmethyl diethyl aluminum dichloride, triphenylmethyl-chloro-boron trifluoride, triphenylmethyl-bromo-antimony pentachloride, diphenylmethyl antimony hexachloride, etc.

The catalysts for the present novel process are prepared by simply admixing about equal molar proportions of the aryl methyl halide and the Friedel-Crafts type halide at room temperature in an inert organic solvent. For example, an equimolar amount of triphenylmethylchloride and antimony pentachloride can be admixed in carbon tetrachloride to form the insoluble salt triphenylmethyl antimony hexachloride. The salt can be filtered off, dried and stored for future use. Alternatively, the catalyst can be prepared in a solvent which dissolves the catalyst salt, such as methylene chloride. In the latter case, the catalyst solution can be used directly to initiate polymerization. In those cases where one or both of the components which form the catalyst are insoluble in the organic solvent in which the catalyst is prepared, it is essential to prepare the catalyst in a solvent which dissolves the catalyst salt. For example, the reaction product of triphenylmethylchloride and zinc chloride can be prepared in methylene chloride and the resulting solution used to initiate polymerization.

The catalyst of the present process can be added directly to the reaction mixture comprising the solvent and monomer, or it can be prepared in situ by the addition of both of the components, which form the catalyst, to the reaction mixture.

The solvents utilized in the present novel polymerization process comprise an essential feature of the polymerization reaction. In general, the solvent comprises chlorinated or brominated aliphatic hydrocarbons that are liquid at the polymerization temperatures employed. Examples of suitable solvents include: methyl chloride, ethyl chloride, methyl bromide, methylene chloride, vinyl chloride, 1,2-dichloroethane, chloroform, n-propyl chloride, n-butyl chloride, or mixtures thereof.

In practicing the present novel process, monomeric cyclopentadiene is polymerized under essentially anhydrous conditions with a polymerizing amount of catalyst, at a temperature of between about 0° C. and about −100° C., preferably from about −20° C. to about −78° C. for from a few seconds to several hours. The pressure at which the present process is carried out will generally be atmospheric. However, pressures from about 0 to about 5 atmospheres gauge, may be utilized in order to retain the solvent and reactants in the liquid state. The present polymerization process is carried out under essentially anhydrous conditions, however, minor contaminating amounts of water e.g. 10 parts per million may be tolerated in the reaction system.

The amount of catalyst needed to polymerize cyclopentadiene in accordance with the procedures of the present process will vary with the specific catalyst used. It can vary from a very small quantity for highly reactive catalysts such as triphenylmethyl hexachloroantimonate and diphenylmethyl hexachloroantimonate to somewhat larger quantities for less reactive catalysts such as triphenylmethyl zirconium pentachloride. In general, however, the amount of catalyst utilized will vary from about 0.01 gram to about 1.0 gram of catalyst per 100 grams of cyclopentadiene monomer.

The soluble, high molecular weight polycyclopentadiene of the present invention varies in viscosity average molecular weight from about 50,000 to 1,000,000 or higher. Correspondingly, the intrinsic or inherent viscosity of the polymer will vary from about 0.2 to 2.0 and higher. The polymers prepared according to the present process vary in character from a clear to a slightly hazy solid that is plastic and somewhat rubbery, to a white flexible fibrous solid. They are soluble in alicyclic organic solvents such as cyclohexane, aromatic compounds such as benzene, toluene and xylene, and halogenated hydrocarbons, such as chloroform and carbon tetrachloride, but are insoluble in conventional acyclic paraffin hydrocarbon solvents, alcohols, ketones, etc. The polycyclopentadienes prepared according to the present process are very reactive and are useful as starting materials for modification by any of the chemical reactions known in the art to apply to compounds containing double bonds. For example, the polymers can be hydrogenated to varying degrees, oxidized, halogenated, reacted with sulfur and sulfur compounds, maleic anhydride, formaldehyde, etc. When they are cured with sulfur, a leather-like product is produced. Moreover, when they are stabilized with suitable anti-oxidants they produce useful self-supporting films and castings.

Whereas the present process relates primarily to the preparation of soluble high molecular weight polycyclopentadiene, it should be noted that it is also applicable to copolymers of cyclopentadiene with other polymerizable monomers conventionally utilized in the art such as sytrene and butadiene.

Molecular weights of the polymers prepared in the subsequent examples were obtained from viscosity measurements of approximately 0.1% polymer solutions in toluene at 25° C. Both intrinsic and inherent viscosities, which were obtained in the conventional manner, were utilized to obtain molecular weight measurements.

The various aspects and modifications of the present process will be made more clearly apparent by reference to the following description and examples.

*Example 1 (runs 1–7)*

In order to illustrate the preparation of the catalyst utilized in the present process, the following seven runs were made.

In run 1, 29.9 grams (0.1 mole) of antimony pentachloride were added dropwise to a solution of 27.8 grams (0.1 mole) of triphenylmethylchloride in 50 ml. carbon tetrachloride. The foregoing was done in a nitrogen dry box. A yellow salt, which precipitated, was recovered, washed with $CCl_4$ and dried at room temperature under reduced pressure. The yellow salt was found to be slightly soluble in methyl chloride and almost infinitely soluble in methylene chloride.

In run 2, the same procedure as described in run 1 was repeated with 20.2 grams (0.1 mole) of diphenylmethylchloride and 29.9 grams (0.1 mole) of antimony pentachloride. An orange, $CCl_4$ insoluble salt was obtained. This salt had a tendency to form a tar-like residue during drying, was slightly soluble in methyl chloride and extremely soluble in methylene chloride. Tar formation was avoided by washing the salt thoroughly with n-heptane before drying.

In run 3, 12.6 grams (0.1 mole) of benzyl chloride were admixed with 29.9 grams (0.1 mole) of antimony pentachloride. A brown precipitate formed which after recovery was found to be insoluble in various alkyl halides and inert as a catalyst for polymerizing cyclopentadiene.

In runs 4–7, triphenylmethylchloride was reacted with equimolar amounts of boron trichloride, stannic chloride, aluminum chloride, and aluminum diethyl monochloride, respectively. All of the resulting salts were found to be effective as catalysts in preparing soluble, high molecular weight polymers of cyclopentadiene according to the present process.

Runs 1, 2 and 4–7 illustrate the flexibility and variety of the present catalyst system. Run 3, on the other hand, demonstrates that when the arylmethyl halide component of the actalyst contains only one aryl group, an inoperative catalyst results.

Example 2 (run 8)

The following example illustrates the preparation of a soluble, high molecular weight polycyclopentadiene.

A 3-neck reaction flask, equipped with stirrer and cold-jacketed dropping funnel, was charged with 200 ml. of methyl-chloride and 50 ml. of cyclopentadiene monomer. The flask was kept under slight nitrogen pressure (about 1 inch of refined white oil having a specific gravity of about 0.88) and was cooled in an acetone-Dry Ice bath. The catalyst was prepared by dissolving 0.2 gram of triphenylmethyl antimony hexachloride in 20 ml. of methylene chloride. Six ml. (0.0001 mole of catalyst) of this solution were dissolved in 25 ml. of methyl chloride. The resultant methyl chloride-catalyst solution was added dropwise to the monomer-solvent mixture at −78° C. The reactants were allowed to stand for one hour whereupon 10 ml. of methyl alcohol were added to quench the reaction and 0.2 gram of ditertiary butyl paracresol was added as an antioxidant. The methyl chloride was boiled off by allowing the reaction mixture to warm to room temperature and 500 ml. of benzene added. A very viscous, clear, colorless solution of polymer resulted. Polymer product was precipitated with a large excess of alcohol and dried for 16 hours at room temperature under a pressure of 1 ml. of mercury. The dried polymer product was a soft, white, fiber-like substance having an inherent viscosity of 2.1.

Example 3 (runs 9–14)

In order to show the importance of utilizing an aliphatic halide solvent, runs 9–14 were performed. In run 9, 5 ml. of cyclopentadiene were added to 10 ml. of methyl chloride solvent, cooled to −78° C., combined with 5 ml. of a methylene chloride catalyst solution, which had a concentration of 0.1 gram of triphenylmethyl antimony hexachloride per 100 ml. methylene chloride, and allowed to stand at −78° C. for 30 minutes. Two grams of high molecular weight soluble polymer which had an intrinsic viscosity of 1.75 were recovered.

Runs 10 to 14 were carried out in exactly the same manner as run 9 except for the solvent used. In place of the methyl chloride used in run 9, methylene chloride, toluene, n-heptane, vinyl chloride and ethyl chloride were respectively used in runs 10 to 14. Runs 10, 13 and 14 gave good yields of soluble, high molecular weight polycyclopentadiene (intrinsic viscosities greater than 1.0). Run 11, which used toluene as the solvent, gave only a trace of polymer product. Run 12, which utilized n-heptane as the diluent, gave no polymer. These six runs demonstrate the importance of using an aliphatic halide diluent in the present novel process.

Example 4 (run 15)

About 1 gram of fused anhydrous powdered zinc chloride was added to about 5 ml. of methylene chloride in a test tube handled in a nitrogen dry box. Thereafter, about 5 ml. of cold cyclopentadiene were added and the contents of the test tube shaken for several minutes. No color change, evolution of heat or any other evidence of polymer formation was observed. Less than 0.1 gram of triphenylmethylchloride was then added to the test tube. Almost instantly a faint yellow color which quickly increased in intensity to an almost orange shade of yellow appeared. Within a few minutes, heat of polymerization suddenly evolved, which required cooling of the test tube in an alcohol-Dry Ice bath. The resulting polymer product stayed in solution and the liquid content of the test tube became very viscous. Isopropyl alcohol was added to precipitate a white polymer which had an inherent viscosity of 0.22.

Example 5 (run 16)

Methylcyclopentadiene dimer was cracked under vacuum and then redistilled under vacuum to give methylcyclopentadiene monomer. A 10 ml. portion of the monomer was diluted with 10 ml. of methyl chloride, cooled to −70° C. and then combined with 25 ml. of methyl chloride saturated with triphenylmethyl antimony hexachloride. A green color developed in the reaction vessel but no solid polymer formed over a period of 2 hours. The reaction vessel was warmed to room temperature but no evidence of polymerization was observed. Subsequent runs, utilizing higher concentrations of catalyst together with varying the catalyst and the diluent proved unsuccessful in preparing any polymer product. This example shows that the present process is not applicable to methylcyclopentadiene.

Example 6

Boron trifluoride was bubbled into 0.3 gram of triphenylmethylchloride dissolved in 25 ml. of carbon tetrachloride for five minutes. A yellow color developed immediately along with the formation of a yellow solid and a red tar-like substance. The yellow solid material was recovered, dissolved in methylene chloride and tested at several concentrations as a catalyst for polymerizing cyclopentadiene in methylene chloride at −78° C. No evidence of polymerization was observed. Thereafter, the red tar-like substance, which was formed concurrently with the yellow solid, was dissolved in methylene chloride and tested for catalytic activity in the same manner. This solution showed a high degree of catalytic activity for polymerizing cyclopentadiene at −78° C. in methylene chloride to a soluble, high molecular weight polymer having an inherent viscosity of 0.411.

Example 7

In accordance with the procedure of Example 2, triphenylmethylchloride was reacted with an equimolar amount respectively of vanadium tetrachloride, vanadium oxytrichloride, titanium trichloride and zirconium tetrachloride. Each of the resulting salts, catalyzed cyclopentadiene to a soluble, high molecular weight polymer.

While there are above described a number of specific embodiments of the present invention, it is obviously possible to produce other embodiments and various equivalent modifications and variations thereof without departing from the spirit of the invention.

Having set forth the general nature and specific embodiments of the present invention, the true scope is now particularly pointed out in the appended claims.

What is claimed is:

1. A process for preparing soluble polymers of cyclopentadiene which comprises polymerizing cyclopentadiene, under essentially anhydrous conditions, with a catalyst comprising the reaction product of about equimolar amounts of (1) an aryl methyl halide represented by the formula $R_nCH_mX$, wherein R is aryl, X is halogen, $n$ is an integer of from 2 to 3, $m$ is an integer of from 0 to 1 and $m$ plus $n$ equals 3 and (2) a Friedel-Crafts type halide, at a temperature of between about 0° C. and about −100° C., in a liquid aliphatic halide solvent.

2. A process for preparing soluble polymers of cyclopentadiene which comprises polymerizing cyclopentadiene, under essentially anhydrous conditions, with a catalyst comprising the reaction product of about equimolar amounts of (1) an aryl methyl halide characterized by the following structural formula:

wherein $R_1$ is selected from the group consisting of phenyl, alkylphenyl, alkoxyphenyl, halophenyl, naphthyl, alkylnaphthyl, alkoxynaphthyl and halonaphthyl; $R_2$ is selected from the group consisting of hydrogen, phenyl, alkylphenyl, alkoxyphenyl, halophenyl, naphthyl, alkylnaphthyl, alkoxynaphthyl and halonaphthyl; and X is selected from the group consisting of chlorine and bromine and (2) a Friedel-Crafts type halide, at a temperature of between 0° C. and about —100° C. in a liquid aliphatic halide solvent selected from the group consisting of aliphatic chlorides and bromides.

3. A process according to claim 2, wherein the temperature is between about —20° C. and —78° C.

4. A process according to claim 2 wherein the aryl methyl halide is triphenylmethylchloride.

5. A process according to claim 2 wherein the aryl methyl halide is diphenylmethylchloride.

6. A process according to claim 2 wherein the Friedel-Crafts halide is antimony pentachloride.

7. A process according to claim 2 wherein the Friedel-Crafts type halide is an alkyl aluminum halide characterized by the formula $AlR_cX_{3-c}$ wherein R is a $C_1$ to $C_{12}$ alkyl, X is selected from the group consisting of chlorine and bromine and c is an integer of from 1 to 2.

8. A process according to claim 2 wherein the aliphatic halide solvent is methylene chloride.

9. A process for preparing soluble polymers of cyclopentadiene which comprises polymerizing cyclopentadiene, under essentially anhydrous conditions, with a catalyst comprising the reaction product of about equimolar amounts of (1) an aryl methyl halide characterized by the following structural formula:

wherein $R_1$ is selected from the group consisting of phenyl, alkylphenyl, alkoxyphenyl, halophenyl, naphthyl, alkylnaphthyl, alkoxynaphthyl and halonaphthyl; $R_2$ is selected from the group consisting of hydrogen, phenyl, alkylphenyl, alkoxyphenyl, halophenyl, naphthyl, alkylnaphthyl, alkoxynaphthyl and halonaphthyl; and X is selected from the group consisting of chlorine and bromine and (2) a Friedel-Crafts type halide, at a temperature of between 0° C. and about —100° C. in a liquid aliphatic halide solvent selected from the group consisting of aliphatic chlorides and bromides, said catalyst being present in amounts of from about 0.01 gram to about 1.0 gram per 100 grams of cyclopentadiene monomer.

10. A process according to claim 9, wherein the temperature is between about —20° C. and —78° C.

11. A process according to claim 9 wherein the aryl methyl halide is triphenylmethylchloride.

12. A process according to claim 9 wherein the Friedel-Crafts halide is antimony pentachloride.

13. A process according to claim 9 wherein the Friedel-Crafts type halide is an alkyl aluminum halide characterized by the formula $AlR_cX_{3-c}$ wherein R is a $C_1$ to $C_{12}$ alkyl, X is selected from the group consisting of chlorine and bromine and c is an integer of from 1 to 2.

14. A process according to claim 9 wherein the aliphatic halide solvent is methylene chloride.

15. Polycyclopentadiene having a viscosity average molecular weight in excess of about 50,000 and being soluble in alicyclic, aromatic and halogenated hydrocarbons.

16. Polycyclopentadiene having a viscosity average molecular weight in excess of about 50,000 and being soluble in alicyclic, aromatic and halogenated hydrocarbons, said polycyclopentadiene being prepared by a process which comprises, polymerizing cyclopentadiene, under essentially anhydrous conditions, with a catalyst comprising the reaction product of about equimolar amounts of (1) an aryl methyl halide characterized by the following structural formula:

wherein $R_1$ is selected from the group consisting of phenyl, alkylphenyl, alkoxyphenyl, halophenyl, naphthyl, alkylnaphthyl, alkoxynaphthyl and halonaphthyl; $R_2$ is selected from the group consisting of hydrogen, phenyl, alkylphenyl, alkoxyphenyl, halophenyl, naphthyl, alkylnaphthyl, alkoxynaphthyl and halonaphthyl; and X is selected from the group consisting of chlorine and bromine and (2) a Friedel-Crafts type halide, at a temperature of between 0° C. and about —100° C. in a liquid aliphatic halide solvent selected from the group consisting of aliphatic chlorides and bromides.

17. Polycyclopentadiene according to claim 16 wherein the Friedel-Crafts type halide is an alky aluminum halide characterized by the formula $AlR_cX_{3-c}$ wherein R is a $C_1$ to $C_{12}$ alkyl, X is selected from the group consisting of chlorine and bromine and c is an integer of from 1 to 2.

18. Polycyclopentadiene having a viscosity average molecular weight in excess of about 50,000 and being soluble in alicyclic, aromatic and halogenated hydrocarbons, said polycyclopentadiene being prepared by polymerizing cyclopentadiene, under essentially anhydrous conditions, with about 0.01 to about 1.0 gram of triphenylmethyl antimony hexachloride per 100 grams of cyclopentadiene monomer at a temperature of between about 0° C. and about —100° C. in a liquid aliphatic halide solvent selected from the group consisting of aliphatic chlorides and aliphatic bromides.

References Cited

UNITED STATES PATENTS

| | | | |
|---|---|---|---|
| 2,273,158 | 2/1942 | Thomas | 260—93.1 |
| 2,314,904 | 3/1943 | Soday | 260—93.1 |
| 2,359,336 | 10/1944 | Trepp | 260—93.1 |

JOSEPH L. SCHOFER, *Primary Examiner.*

L. EDELMAN, *Assistant Examiner.*